United States Patent [19]

Sasaki et al.

[11] Patent Number: 5,267,085
[45] Date of Patent: Nov. 30, 1993

[54] ZOOM LENS APPARATUS OF TWO-LENS GROUP STRUCTURE

[75] Inventors: Saburo Sasaki, Tokyo; Ikuya Tsurukawa, Yokohama; Hiroshi Terui, Tokyo, all of Japan

[73] Assignee: Ricoh Company, Ltd., Tokyo, Japan

[21] Appl. No.: 817,369

[22] Filed: Jan. 6, 1992

[30] Foreign Application Priority Data

Jan. 18, 1991 [JP] Japan .................................. 3-4539

[51] Int. Cl.[5] ............................................. G02B 15/14
[52] U.S. Cl. .................................... 359/694; 359/697; 358/227; 354/400
[58] Field of Search ........ 359/694, 697, 698, 691–693, 359/696; 354/400, 402, 404, 409; 358/225, 227

[56] References Cited

U.S. PATENT DOCUMENTS 5,005,956  4/1991  Kaneda et al. ............... 359/698
5,027,147  6/1991  Kaneda ........................ 359/697

FOREIGN PATENT DOCUMENTS 56-165106 12/1981 Japan .
61-259210 11/1986 Japan .
64-55510   3/1989 Japan .

Primary Examiner—Bruce Y. Arnold
Assistant Examiner—James Phan
Attorney, Agent, or Firm—Oblon, Spivak, McClelland, Maier & Neustadt

[57] ABSTRACT

In a zoom lens device of a two-lens group structure, positive and negative lens groups are sequentially arranged from a photographing field side. The zoom lens device has a controller for controlling a rear focusing operation for moving the negative lens group on a high magnification side. The controller also controls one of an entire drawing-out focusing operation for moving the positive and negative lens groups, and a front focusing operation for moving the positive lens group on a low magnification side. The high and low magnification sides are respectively set to telescopic and wide angle sides. A focal length of the zoom lens device is increased on the high magnification side and is decreased on the low magnification side. Thus, a zoom ratio is increased and a lens drawing-out amount is reduced on the telescopic side so that the zoom lens device can be made compact.

2 Claims, 3 Drawing Sheets

ZOOM LENS APPARATUS OF TWO-LENS GROUP STRUCTURE

BACKGROUND OF THE INVENTION

1. Field of the Invention

The present invention relates to a zoom lens device of a two-lens group structure used in a still camera, a video camera, etc.

2. Description of the Related Art

In a general known zoom lens device of a two-lens group structure, the construction of a zoom optical system is simplified and the zoom optical system is made compact.

A zoom lens of a two-lens group structure has various kinds of constructions. There is a zoom lens of a two-lens group structure in which positive and negative lens groups are sequentially arranged from the side of a photographing field. Such a zoom lens can be generally classified into the following three focusing systems in accordance with a difference in focusing operation.

A first focusing system is a front focusing system. In this front focusing system, a positive lens group is moved to control a focusing operation while a negative lens group is stopped in a position in which the negative lens group is located at a zooming time.

A second focusing system is a rear focusing system. In this rear focusing system, the negative lens group is moved to control a focusing operation while the positive lens group is stopped in a position in which the positive lens group is located at the zooming time.

A third focusing system is an integrally driving system. In this integrally driving system, the positive and negative lens groups are moved to control a focusing operation.

It is important to make a camera compact and increase a zoom ratio so as to improve the portability of a camera and enlarge a photographing condition. It is concretely considered that the camera is made compact and the zoom ratio is increased by reducing a length from a film face within the camera to a front end of a photographing lens.

In the front focusing system and the integrally driving system, the positive lens group is further drawn out at the zooming and telescopic times in the case of a most proximate photographing operation. Accordingly, a length from a film face to the front end of the photographing lens including the length at the focusing time is increased.

In contrast to this, in the rear focusing system, no positive lens group is drawn out. When a distance between a film face and the negative lens group including the distance at the focusing time is equal to zero, the length from the front end of the photographing lens to the film face is set as a minimum limit.

In the front focusing system and the integrally driving system, a drawing-out amount of the positive lens group on a telescopic side is reduced when the lengths from the front end of the photographing lens to the film face in the above three focusing systems are equal to each other. Thus, distances between the positive and negative lens groups are increased in the front focusing system and the integrally driving system. Accordingly, it is impossible to set a focal length longer than that provided in the rear focusing system.

For example, when the camera is concretely designed without considering a macro photograph, a zoom lens capable of performing a zooming operation in the region of a focal length from 38 to 80 mm fulfills an additional function in which the macro photographing operation can be performed in an entire zooming region. In this case, the size of a zooming region on a wide angle side is reduced to secure a moving amount of the negative lens group on a side of the film face so that only a zooming region of the focal length from 40 to 80 mm is set.

As mentioned above, in the rear focusing system, the zooming region on the wide angle side at a normal photographing time is reduced in size to perform a macro photographing operation of low frequency in use. When the lengths from the front end of the photographing lens to the film face in the above three focusing systems are equal to each other, it is impossible to set a shorter focal length on the wide angle side in comparison with the front focusing system and the integrally driving system.

SUMMARY OF THE INVENTION

It is therefore an object of the present invention to provide a zoom lens device of a two-lens group structure in which the zoom lens device is made compact and a zoom ratio is increased.

The above object of the present invention can be achieved by a zoom lens device of a two-lens group structure in which positive and negative lens groups are sequentially arranged from a photographing field side, the zoom lens device comprising control means for controlling a rear focusing operation for moving the negative lens group on a high magnification side; the control means controlling one of an integrally driving operation for moving the positive and negative lens groups, and a front focusing operation for moving the positive lens group on a low magnification side. The focusing controls are switched when a lens moving amount in the rear focusing operation is larger than that in the integrally driving operation.

In the above structure, zooming and focusing operations are performed by a rear focusing system on a telescopic side. The zooming and focusing operations are performed by a front focusing system or an integrally driving system on a wide angle side. Accordingly, a focal length of the zoom lens device can be increased on the telescopic side and can be decreased on the wide angle side. Therefore, a zoom ratio of the zoom lens device can be increased as a whole. Further, a lens drawing-out amount is reduced on the telescopic side so that the zoom lens device can be made compact.

The focusing control systems are switched when the lens moving amount in the rear focusing system is larger than that in the integrally driving system. Accordingly, it is possible to reduce a time for performing the focusing operation.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a zoom lens device of a two-lens group structure in the present invention will next be described in detail with reference to the accompanying drawings.

A zoom lens of a two-lens group structure has various kinds of constructions. There is a zoom lens of a two-lens group structure in which positive and negative lens groups are sequentially arranged from the side of a photographing field. Such a zoom lens can be generally classified into the following three focusing systems in accordance with a difference in focusing operation.

A first focusing system is a front focusing system which is called a front system in the following description. In this front focusing system, a positive lens group is moved to control a focusing operation while a negative lens group is stopped in a position in which the negative lens group is located at a zooming time.

Figure 1:
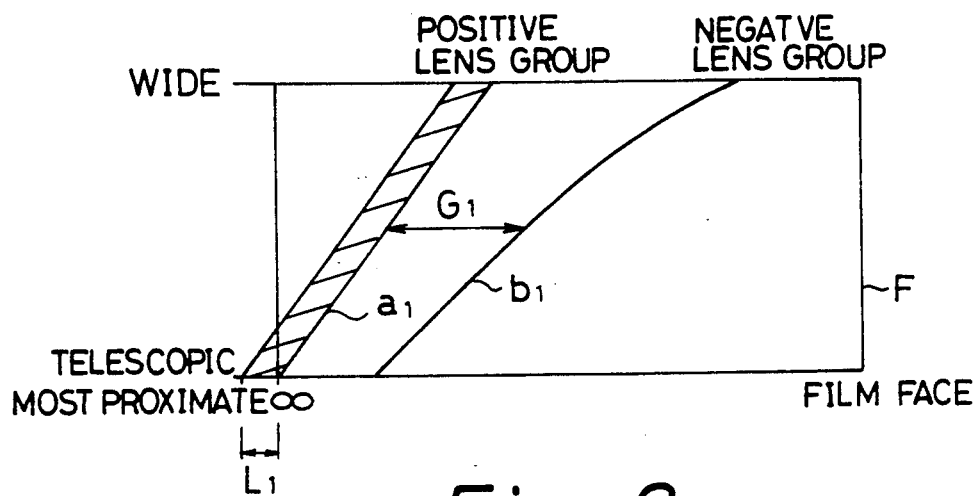
FIG. 1 is a diagram showing moving lines of lens groups in a front focusing system.

In this front focusing system, the positive lens group is moved at the zooming time in accordance with a moving curve $a_1$ shown in FIG. 1 and provided at the time of an infinite distance ($\infty$). Simultaneously, the negative lens group is moved in accordance with a moving curve $b_1$. Thus, a focal length of the zoom lens is set to an arbitrary focal length from a low magnification side to a high magnification side. The low and high magnification sides are respectively equal to wide angle and telescopic sides. At a focusing time, while the negative lens group is stopped in a zooming position, only the positive lens group is moved between a position at the time of the infinite distance and a position at the time of a most proximate distance. Namely, the positive lens group is moved in a range of the moving curve $a_1$ shown by hatching in FIG. 1, thereby performing a focusing operation.

A second focusing system is a rear focusing system which is called a rear system in the following description. In this rear focusing system, the negative lens group is moved to control a focusing operation while the positive lens group is stopped in a position in which the positive lens group is located at the zooming time.

Figure 2:
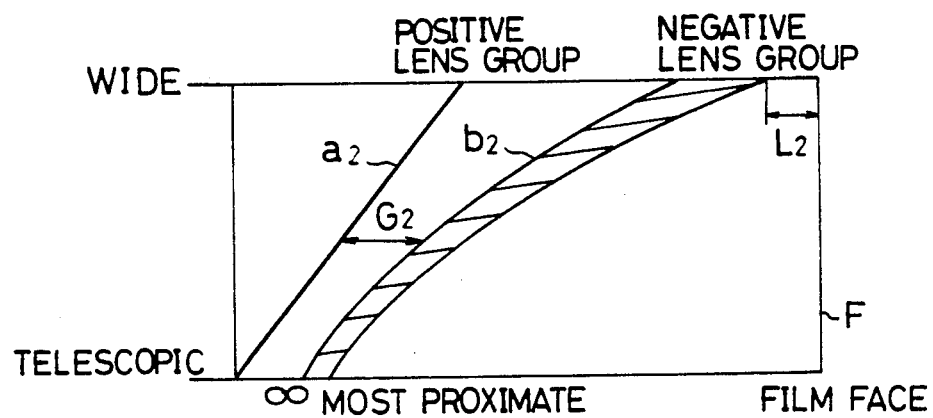
FIG. 2 is a diagram showing moving lines of lens groups in a rear focusing system.

In this rear focusing system, as shown in FIG. 2, the positive lens group is moved at the zooming time in accordance with a moving curve $a_2$ and the negative lens group is moved at the zooming time in accordance with a moving curve $b_2$. Thus, the focal length of the zoom lens is set to an arbitrary focal length. At a focusing time, only the negative lens group is moved between a position at the time of an infinite distance and a position at the time of a most proximate distance. Namely, the negative lens group is moved in a range of the moving curve $b_2$ shown by hatching in FIG. 2, thereby performing a focusing operation.

A third focusing system is an integrally driving system. In this integrally driving system, the positive and negative lens groups are moved to control a focusing operation.

Figure 3:
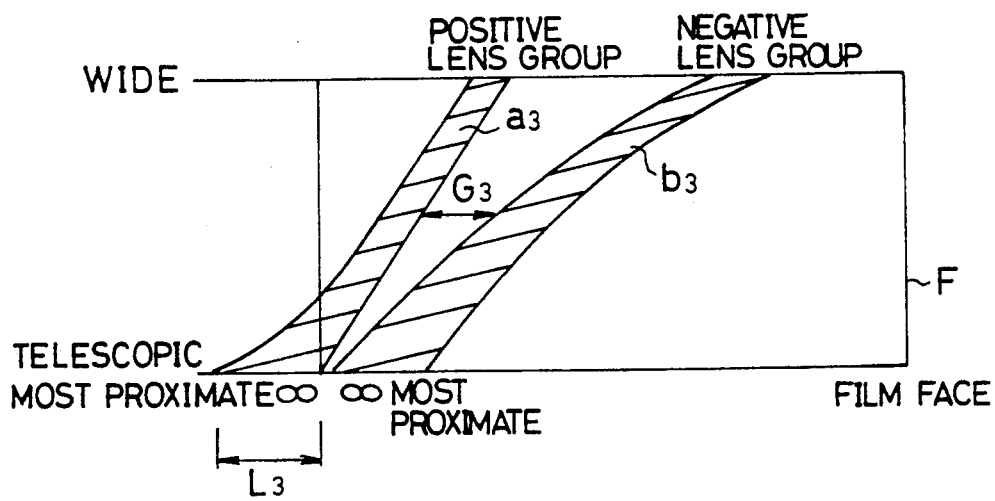
FIG. 3 is a diagram showing moving lines of lens groups in an integrally driving system.

In this integrally driving system, as shown in FIG. 3, the positive lens group is moved at the zooming time in accordance with a moving curve $a_3$ and the negative lens group is moved at the zooming time in accordance with a moving curve $b_3$. Thus, the focal length of the zoom lens is set to an arbitrary focal length. At a focusing time, each of the positive and negative lens groups is moved between a position at the time of an infinite distance and a position at the time of a most proximate distance. Namely, the positive and negative lens groups are respectively moved in ranges of the moving curves $a_3$ and $b_3$ shown by hatching in FIG. 3, thereby performing a focusing operation.

It is important to make a camera compact and increase a zoom ratio so as to improve portability of the camera and enlarge a photographing condition. It is concretely considered that the camera is made compact and the zoom ratio is increased by reducing a length from a film face within the camera to a front end of a photographing lens.

In the front focusing system and the integrally driving system, the positive lens group is further drawn out as shown by reference numerals $L_1$ and $L_3$ in FIGS. 1 and 3 at the zooming and telescopic times in the case of a most proximate photographing operation. Accordingly, a length from a film face F to the front end of the photographing lens including the length at the focusing time is increased.

In contrast to this, in the rear focusing system, no positive lens group is drawn out. As shown in FIG. 2, when a distance $L_2$ between a film face F and the negative lens group including the distance at the focusing time is equal to zero, the length from the front end of the photographing lens to the film face F is set as a minimum limit.

In the front focusing system and the integrally driving system, a drawing-out amount of the positive lens group on a telescopic side is reduced when the lengths from the front end of the photographing lens to the film face F in the above three focusing systems are equal to each other. Thus, distances $G_1$ and $G_3$ between the positive and negative lens groups are increased in the front focusing system and the integrally driving system. Accordingly, it is impossible to set a focal length longer than that provided in the rear focusing system.

In contrast to this, in the rear focusing system, the camera can be set at a wider angle as the negative lens group approaches the film face. Namely, the camera can be set at a wider angle as the distance $L_2$ is reduced. In this case, when the camera has a macro function, a focusing amount of the camera at the most proximate distance is changed in accordance with the importance of a macro or normal photograph. For example, when the focusing amount at the time of a macro photographing operation is set to be large, a most proximate photographing position in a normal photographing operation must be set to a position far from the film face F so that the distance $L_2$ must be increased.

For example, when the camera is concretely designed without considering the macro photograph, a zoom lens capable of performing a zooming operation in the region of a focal length from 38 to 80 mm fulfills an additional function in which the macro photographing operation can be performed in an entire zooming region. In this case, the size of a zooming region on a wide angle side is reduced to secure a moving amount of the negative lens group on a side of the film face F so that only a zooming region of the focal length from 40 to 80 mm is set.

As mentioned above, in the rear focusing system, the zooming region on the wide angle side at the normal photographing time is reduced in size to perform the macro photographing operation of low frequency in use. When the lengths from the front end of the photographing lens to the film face F in the above three focusing systems are equal to each other, it is impossible to set a shorter focal length on the wide angle side in comparison with the front focusing system and the integrally driving system.

Figure 4:
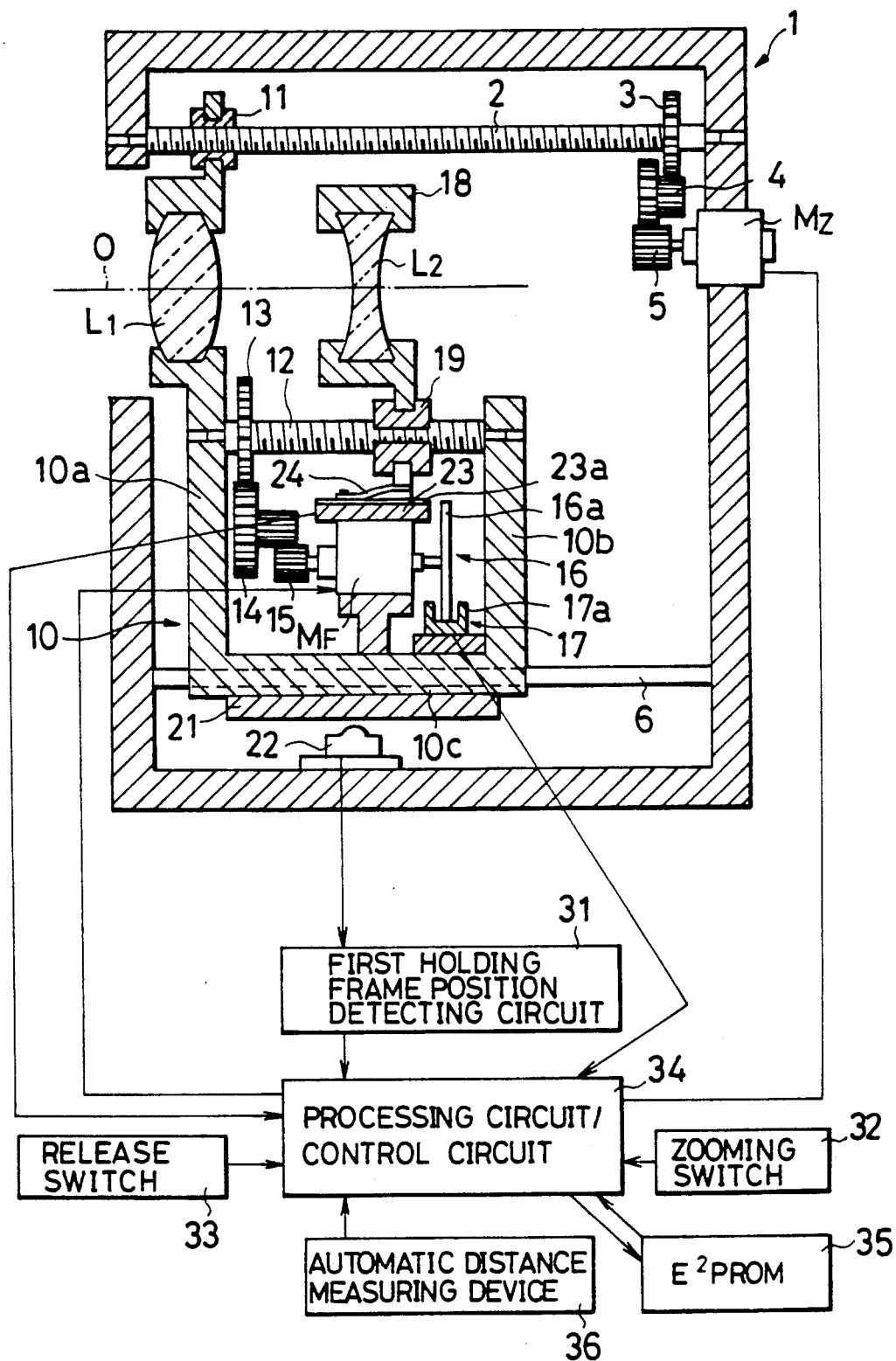
FIG. 4 is a view showing the construction of a zoom lens device of a two-lens group structure in accordance with one embodiment of the present invention.

FIG. 4 is a view showing the construction of a zoom lens device of a two-lens group structure in accordance with one embodiment of the present invention. In this zoom lens device, a positive lens group $L_1$ has positive refracting power and a negative lens group $L_2$ has negative refracting power. The positive lens group $L_1$ and the negative lens group $L_2$ are sequentially arranged from the side of a photographing field and can be relatively moved forward and backward on a photographing optical axis O.

In FIG. 4, a body tube 1 has a first lead screw 2 for moving a first holding frame 10 forward and backward along the photographing optical axis O. As described later, the first holding frame 10 holds the positive lens group $L_1$ in an internal space of the body tube 1. This first lead screw 2 is arranged in parallel with the photographing optical axis O. A first lead screw gear 3 is disposed in one end portion of the first lead screw 2 such that the first lead screw gear 3 is integrally rotated together with the first lead screw 2. The first lead screw gear 3 is connected to a driving output gear 5 of a zooming motor $M_z$ through an idle gear 4. The zooming motor $M_z$ moves the first holding frame 10 in a predetermined direction and is fixed to the body tube 1.

An antirotation bar 6 prevents the first holding frame 10 from being rotated when the first lead screw 2 is rotated in normal and reverse directions. The antirotation bar 6 guides a movement of the first holding frame 10 and is arranged between opposite side walls of the body tube 1.

The first holding frame 10 is formed in a recessed shape in which an upper end of a wall portion 10a disposed on the photographing field side and holding the positive lens group $L_1$ is projected from an upper end of a wall portion 10b on a film side. The antirotation bar 6 is inserted into a bottom portion 10c of the first holding frame 10 with play. A first female screw collar 11 is fixed to an upper end portion of the wall portion 10a in the first holding frame 10 and is screwed onto the first lead screw 2. When the first lead screw 2 is rotated in the normal and reverse directions, rotational force of the first lead screw 2 is applied to the first female screw collar 11 so that the first female screw collar 11 is moved. Thus, the first holding body 10 is moved forward and backward along the photographing optical axis O.

A second lead screw 12 is disposed to move a second holding frame 18 forward and backward along the photographing optical axis O. The second lead screw 12 is rotatably arranged in parallel with the photographing optical axis O between the wall portions 10a and 10b of the first holding frame 10.

A second lead screw gear 13 is fixed to the second lead screw 12 such that the second lead screw gear 13 and the second lead screw 12 can be integrally rotated. The second lead screw gear 13 is connected to a driving output gear 15 through an idle gear 14. The driving output gear 15 is attached to one output shaft of a focusing motor $M_F$.

The focusing motor $M_F$ is disposed to move the second holding frame 18 and is arranged on the bottom portion 10c of the first holding frame 10. An encoder blade 16 is fixed to another output shaft of the focusing motor $M_F$. The encoder blade 16 has a series of slits 16a for detecting the number of rotations of this focusing motor in an edge portion thereof.

A photocoupler 17 is combined with the encoder blade 16 and is arranged on the bottom portion 10c of the first holding frame 10. This photocoupler 17 has a photoelectric detecting portion 17a for holding the edge portion of the encoder blade 16 on both sides thereof such that the photocoupler 17 and this edge portion are spaced from each other by a suitable distance. The photoelectric detecting portion 17a detects a pulse light beam passing through the series of slits 16a of the encoder blade 16, thereby detecting the number of rotations of the focusing motor $M_F$.

The second holding frame 18 holds the negative lens group $L_2$ on the photographing optical axis O. A second female screw collar 19 is fixed to a basic portion of the second holding frame 18 and is screwed onto the second lead screw 12. The second female screw collar 19 is moved by rotating the second lead screw 12 in normal and reverse directions so that the second holding frame 18 is moved forward and backward along the photographing optical axis O.

A pattern substrate 21 is fixed onto a lower face of the bottom portion 10c of the first holding frame 10 to detect a position of the positive lens group. An unillustrated reading pattern is formed on a lower face of this pattern substrate 21 to detect a relative position of the positive lens group $L_1$ to the body tube 1.

A magnetic resistance element (MR element) 22 is disposed to read the above reading pattern in a non-contact state. The magnetic resistance element 22 is disposed in a portion of the body tube 1 opposite to the pattern substrate 21. A first holding frame position detecting circuit 31 is connected to the magnetic resistance element 22 and detects a position of the first holding frame 10 on the optical axis on the basis of a position signal transmitted from the magnetic resistance element 22.

A zooming switch 32 is disposed to perform a zooming operation of the zoom lens device. The zooming switch 32 is constructed by a switch for moving the first holding frame 10 from a telescopic side to a wide angle side, and a switch for moving the first holding frame 10 from the wide angle side to the telescopic side. When turning-on and turning-off signals of this zooming switch 32 are inputted to a processing circuit/control circuit 34, the processing circuit/control circuit 34 gives commands for starting and completing the zooming operation. The processing circuit/control circuit 34 functions as a processing circuit and a control circuit and is called a control circuit in the following description.

A release switch 33 is operated in association with the operation of an unillustrated shutter button. Turning-on and turning-off signals of the release switch 33 are inputted to the control circuit 34.

The control circuit 34 constitutes a control means constructed by a micro central processing unit (CPU). The control circuit 34 receives and transmits data with respect to the first photocoupler 17, the holding frame position detecting circuit 31, the zooming switch 32, the release switch 33, the zooming motor $M_Z$, the focusing motor $M_F$, a substrate 23 for the detection of a focusing position, and an automatic distance measuring device 36. Further, an E²PROM (PROM of an electric erasing type) 35 as a memory means is connected to the control circuit 34 and stores moving lines of the first holding frame 10 and the second holding frame 18 in zooming and focusing operations described later.

An operation of the zooming lens device in the above embodiment will next be described.

Figure 5:
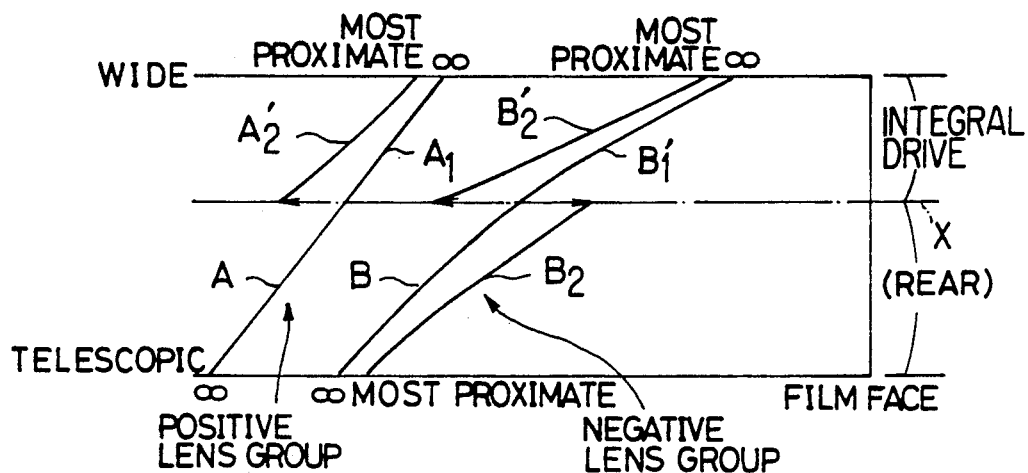
FIG. 5 is a diagram showing moving lines of lens groups in this embodiment.

As shown in FIG. 5, in this embodiment, the above moving lines are stored to the E²PROM 35 such that the zooming and focusing operations are performed by the rear focusing system on the telescopic side and are performed by the integrally driving system on the wide angle side. A switching operation of the rear focusing system and the integrally driving system is controlled by the control circuit 34 receiving data from the E²PROM 35.

The rear focusing system and the integrally driving system are switched as shown by portion X in FIG. 5 when a lens moving amount at a focusing time in the rear focusing system is larger than that in the integrally driving system. The integrally driving system is used on the wide angle side from the above time shown by portion X. A lens drawing-out amount is large on the telescopic side in the case of the integrally driving system and is large on the wide angle side in the case of the rear focusing system. Accordingly, the rear focusing system and the integrally driving system are switched to reduce a time for drawing-out the lens groups. Namely, as mentioned above, the rear focusing system is used on the telescopic side and the integrally driving system is used on the wide angle side to reduce the lens drawing-out time.

An operation of the zoom lens device on the telescopic side will next be described. As mentioned above, the rear focusing system is used on the telescopic side. For brevity, FIG. 6 shows moving lines of the lens groups when the rear focusing system is used in an entire zooming region.

First, an operator as a photographer turns on the zooming switch 32. The zooming switch 32 is turned on until a desirable photographing field angle is obtained. When a turning-on signal of this zooming switch 32 is inputted to the control circuit 34, the control circuit 34 outputs a signal for starting the zooming motor $M_Z$. Rotational force of this zooming motor $M_Z$ is transmitted to the first female screw collar 11 through the driving output gear 5, the idle gear 4, the first lead screw gear 3 and the first lead screw 2. Thus, the first holding frame 10, i.e., the positive lens group $L_1$ is moved along a moving curve A shown in FIG. 6 until the desirable photographing field angle is obtained.

Figure 6:
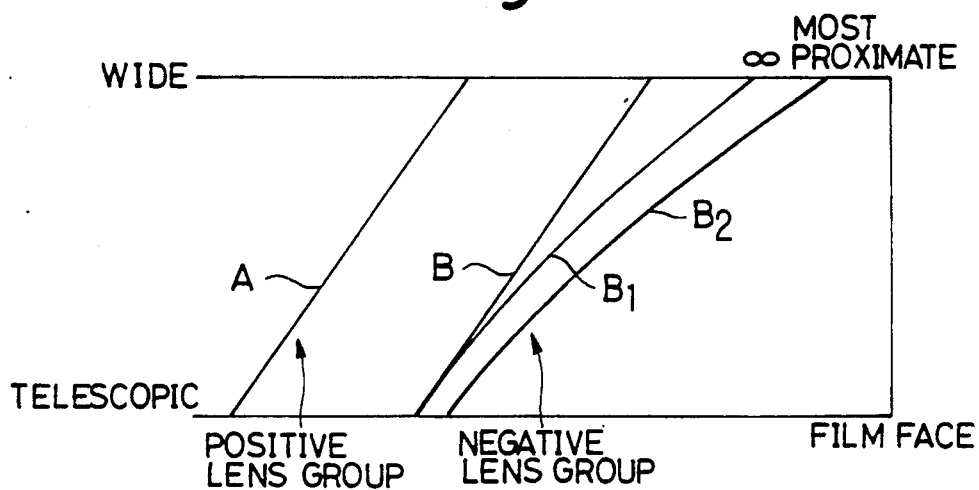
FIG. 6 is a moving line diagram for explaining movements of lens groups in this embodiment.

The second holding frame 18 disposed in the first holding frame 10, i.e., the negative lens group $L_2$ is moved along a moving curve B shown in FIG. 6 in parallel with the moving curve A.

When the desirable photographing field angle is obtained, the movement of the first holding frame 10 is stopped by turning off the zooming switch 32 by the operator. A stopping position of the first holding frame 10 is detected by a cooperating action of the pattern substrate 21 and the magnetic resistance element 22. This stopping position is transmitted to the first holding frame position detecting circuit 31 as position information of the first holding frame 10. The first holding frame position detecting circuit 31 then performs analog/digital converting processing of this position information, etc., and outputs converted data to the control circuit 34.

The control circuit 34 judges on the basis of the above position information whether this zooming position is located on the telescopic side and a focusing operation using the rear focusing system is required, or this zooming position is located on the wide angle side and a focusing operation using the integrally driving system is required. In this case, the rear focusing system is used.

The automatic distance measuring device 36 automatically measures a distance from the zoom lens advice to a photographed object at that time by a turning-on signal of the release switch 33. The control circuit 34 determines a drawing-out amount of the second holding frame 18 based on the above position information and a distance measuring signal transmitted from the automatic distance measuring device 36. The control circuit 34 then rotates the focusing motor $M_F$ such that the negative lens group $L_2$ is moved from a position on the moving curve B to a predetermined position between a moving curve $B_2$ at the time of a most proximate distance and a moving curve $B_1$ at the time of an infinite distance.

Rotational force of the focusing motor $M_F$ is transmitted to the second female screw collar 19 through the driving output gear 15, the idle gear 14, the second lead screw gear 13 and the second lead screw 12. Thus, the second holding frame 18, i.e., the negative lens group $L_2$ is moved to the above predetermined position. At this time, a rotational amount of the focusing motor $M_F$ is detected by the encoder blade 16 and the photocoupler 17 and is outputted to the control circuit 34 as information of a total moving amount of the second holding frame 18.

The control circuit 34 compares this total moving amount with a moving amount set in advance. When these moving amounts are in conformity with each other, the control circuit 34 outputs a rotation stopping signal to the focusing motor $M_F$.

In this state, the zoom lens is stopped at the desirable photographing field angle in a position in which the focusing operation is suitably performed.

An operation of the zoom lens device on the wide angle side will next be described. An operator as a photographer turns on the zooming switch 32. Thus, similar to the above case, the control circuit 34 is operated to move the first holding frame 10 until a desirable photographing field angle is obtained. The movement of the first holding frame 10 is stopped by turning off the zooming switch 32. Thus, the control circuit 34 judges on the basis of the information of a stopping position of the first holding frame 10 transmitted from the first holding frame position detecting circuit 31 whether the zooming position is located on the telescopic or wide angle side as mentioned above. In this case, it is judged that the integrally driving system is used on the wide angle side.

Figure 7:
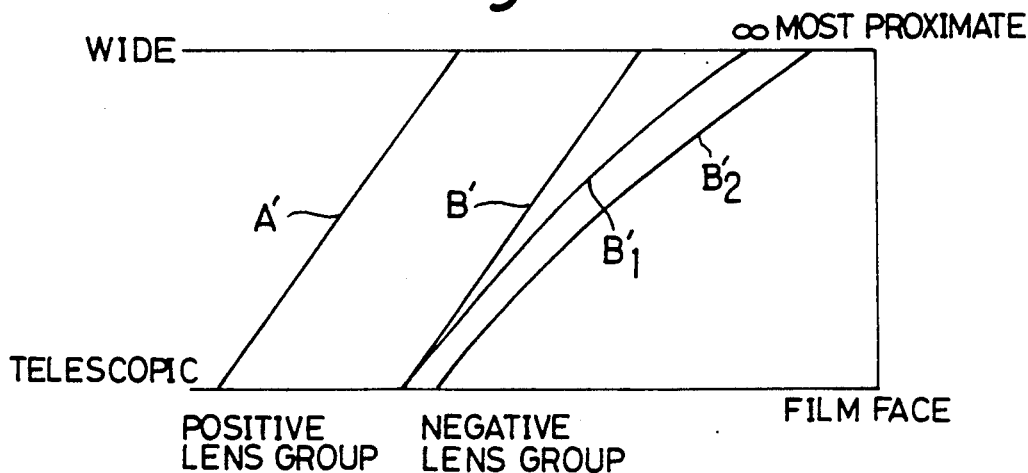
FIG. 7 is a moving line diagram for explaining movements of lens groups in this embodiment.

The positive lens group $L_1$ and the negative lens group $L_2$ are moved in parallel with each other as shown by moving curves A' and B' in a moving line diagram of the lens groups in FIG. 7 even in the case of the integrally driving system. At a focusing time described later, the negative lens group $L_2$ is moved to a predetermined position between a moving curve $B_2'$ at the time of a most proximate distance and a moving curve $B_1'$ at the time of an infinite distance. To reduce a time for moving the negative lens group $L_2$ to this predetermined position, the control circuit 34 rotates the focusing motor $M_F$ to move the negative lens group $L_2$ to a position at the time of the infinite distance corresponding to a position of the positive lens group $L_1$. Thus, the next focusing operation is prepared.

Thereafter, the release switch 33 is turned on. Thus, similar to the above case, the automatic distance measuring device 36 automatically measures the distance from the zoom lens apparatus to the photographed object. A required focusing amount is then calculated by the control circuit 34 to determine a rotational amount of the zooming motor $M_Z$. As mentioned above, the first holding frame 10 is moved by rotating the zooming motor $M_Z$ by this rotational amount. Thus, the positive lens group $L_1$ and the negative lens group $L_2$ are moved in parallel with each other by the same distance. As shown in FIG. 5, the lens groups $L_1$ and $L_2$ are respectively moved to predetermined positions between moving curves $A_2'$, $B_2'$ at the time of the most proximate distance and moving curves $A_1'$, $B_1'$ at the time of the infinite distance. Thus, the focusing operation using the integrally driving system is performed.

A concrete method for moving the above lens groups $L_1$ and $L_2$ is summarized as follows.

(1) The zooming motor $M_Z$ and the focusing motor $M_F$ are driven at the zooming time.

(2) At the focusing time, only the focusing motor $M_F$ is driven on the telescopic side and only the zooming motor $M_z$ is driven on the wide angle side.

In this method, a time for operating the zoom lens device is reduced.

In the above embodiment, the operation of the zoom lens device is controlled such that the rear focusing system is used on the telescopic side and the integrally driving system is used on the wide angle side. Thus, it is possible to increase a focal length of the zoom lens device on the telescopic side and decrease the focal length of the zoom lens device on the wide angle side. Accordingly, it is possible to increase a zoom ratio of the zoom lens device as a whole. Further, the zoom lens device can be made compact since a drawing-out amount of the positive lens group is reduced on the telescopic side.

Similar effects can be also obtained when the rear focusing system is used on the telescopic side and the front focusing system instead of the integrally driving system is used on the wide angle side.

In this case, in the general front focusing system, a lens moving amount at the focusing time is reduced in comparison with the integrally driving system, but a high accuracy in focusing operation is required. Further, a means for moving the positive lens group $L_1$ is required in addition to the structure shown in FIG. 4. Otherwise, after the positive and negative lens groups $L_1$ and $L_2$ are moved by the zooming motor $M_z$ in parallel with each other by front focusing amounts, it is necessary to return the negative lens group $L_2$ by the moving amount thereof using the focusing motor $M_F$.

As mentioned above, in accordance with the present invention, the rear focusing system and the integrally driving system are switched in a magnification region of a zoom lens. Otherwise, the rear focusing system and the front focusing system are switched in a magnification region of a zoom lens. Thus, it is possible to provide a zoom lens device of a two-lens group structure in which the zoom lens device is made compact and a zoom ratio is increased and a time for performing a focusing operation is reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A zoom lens device of a two-lens group structure, comprising:

a positive lens group having positive retracting power;

a negative lens group having negative refracting power;

a first holding frame disposed movably along a first holding photographing optical axis for holding said positive lens group movably on said optical axis;

a second holding frame disposed movably in said first holding frame for positioning said negative lens group on an opposite side of a photographing field with respect to said positive lens group, and for holding said negative lens movably on said optical axis;

a first driving means connected to said first holding frame and fixed to said device for moving said positive lens group along said optical axis;

a second driving means connected to said second holding frame and fixed to said first holding frame for moving said negative lens group along said optical axis; and a control means electrically connected to said first driving means and said second driving means for controlling respectively operations of said first driving means and said second driving means;

said control means being adapted to control a zooming operation, and subsequently to said zooming operation, to perform a focusing control in a rear focusing system in a case where a zooming position is located on a high magnification side and to perform a focusing control in an integrally driving system in a case where a zooming position is located on a low magnification side;

in said zooming operation, said control means operating said first driving means so as to move said positive lens group along a first moving curve predetermined with respect to said positive lens group, while operating said second driving means so as to move said negative lens group along a second moving curve predetermined with respect to said negative lens group, and thereafter said control means stopping operations of said first and second driving means so as to stop said positive and negative lens groups in a position where a predetermined photographing field angle is obtained;

in said focusing control in the rear focusing system, said control means determining a required focusing amount, and operating said second driving means so as to move said negative lens group by said determined focusing amount from a position where said negative lens group has been stopped on said second moving curve toward another position at a time of a most proximate distance corresponding to said position;

in said focusing control in the integrally driving system, said control means determining a required focusing amount, and operating said first driving means so as to move said positive and negative lens groups by said determined focusing amount while maintaining a distance between said positive and negative lens groups constant, wherein said positive lens group is moved from a first position where said positive lens group has been stopped on said first moving curve toward a position at a time of a most proximate distance corresponding to said first position by said determined focusing amount, and said negative lens group is moved from a second position where said negative lens group has been stopped on said second moving curve toward a position at a time of a most proximate distance corresponding to said second position by said determined focusing amount.

2. A zoom lens device of a two-lens group structure according to claim 1, wherein said focusing controls are switched when a lens moving amount in the rear focusing system is larger than that in the integrally driving system.

* * * * *